(12) United States Patent
Finch (10) Patent No.: US 7,000,043 B2
(45) Date of Patent: Feb. 14, 2006

(54) METHODS AND APPARATUS FOR CONTROLLING PERFORMANCE OF A COMMUNICATIONS DEVICE

(75) Inventor: Peter D. Finch, Dunstable, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 349 days.

(21) Appl. No.: 10/246,067

(22) Filed: Sep. 18, 2002

(65) Prior Publication Data

US 2004/0054828 A1   Mar. 18, 2004

(51) Int. Cl.
 *G06F 13/00*   (2006.01)
 *G06F 3/00*   (2006.01)
(52) U.S. Cl. .............................. 710/104; 710/8; 710/11
(58) Field of Classification Search ................ 710/104, 710/11, 8
 See application file for complete search history.

(56) References Cited

U.S. PATENT DOCUMENTS

| | | | |
|---|---|---|---|
| 6,023,736 A * | 2/2000 | Lambeth et al. ............... | 710/10 |
| 6,199,137 B1 * | 3/2001 | Aguilar et al. ............... | 710/305 |
| 6,463,528 B1 * | 10/2002 | Rajakarunanayake et al. . | 713/1 |
| 6,477,611 B1 * | 11/2002 | Chang ........................ | 710/313 |
| 6,801,331 B1 * | 10/2004 | Motoyama ................. | 358/1.15 |
| 2003/0097427 A1 * | 5/2003 | Parry ......................... | 709/220 |

* cited by examiner

*Primary Examiner*—Rehana Perveen
*Assistant Examiner*—Christopher A. Daley
(74) *Attorney, Agent, or Firm*—Chapin & Huang, LLC; Barry W. Chapin, Esq.

(57) ABSTRACT

Mechanisms and techniques provide a system for controlling performance of a data communications device that operates an input output protocol and/or architecture such as Infiniband by setting a configuration parameter of the input output protocol to a first value. The configuration parameter describes, to the input output protocol operating within the device, a virtual physical connectivity characteristic of the communications interface of the device to at least one other device operating the input output protocol. The system operates the device to communicate data, over the communications interface, at a first performance level corresponding to the first value of the configuration parameter and changes the first value of the configuration parameter to a second value such that the input output protocol perceives a virtual change to the physical connectivity characteristic of the device without the device experiencing an actual change to its physical connectivity characteristic of the communications interface. The system then operates the device to communicate data, over the communications interface, at a second performance level corresponding to the second value of the configuration parameter.

26 Claims, 4 Drawing Sheets

METHODS AND APPARATUS FOR CONTROLLING PERFORMANCE OF A COMMUNICATIONS DEVICE

FIELD OF THE INVENTION

The present invention generally relates to systems for controlling performance of a data communications device that operates using an input output protocol over an interconnect architecture, and more particularly, to systems, mechanisms and techniques that operate to control bandwidth of a channel adapter that communicates using the Infiniband interconnect architecture.

BACKGROUND OF THE INVENTION

Conventional computerized devices such as personal computer systems, workstations, minicomputers and mainframes require the ability to transmit data between components within, and attached to such computerized devices at very high rates of speed. As an example, consider a typical conventional personal computer system containing a processor, a memory system and a variety of peripheral input output components such as storage devices (e.g., floppy disks, hard disks, CD-ROM drives, etc.), network interface connections (e.g., modems or Ethernet network interface cards), video display devices, audio output devices (e.g., soundcards) and so forth. A data bus that interconnects such components within the computer system allows such components to exchange data with each other and allows one component, such as a processor, to control operation of another component such as a memory system or a video display card. Generally, a data bus or interconnect architecture includes a collection of communications hardware and physical data links or connections that couple various devices or components within a computer system environment, as well as software or firmware which operates one or more input output protocols to control communications over the communications hardware and data links. One type of data bus that computer and devices designers commonly use to interconnect components with computer systems and computerized devices is called as a Peripheral Component Interconnect (PCI) bus.

A PCI bus provides a shared bus architecture that allows a processor such as a central processing unit (CPU) operating within the computer system to control access to the PCI bus by components that need to transmit data on the bus. The PCI bus architecture operates at a preset or predefined speed (e.g., 100-Mhz) and forces components on the PCI bus to share the total available bus bandwidth using various bus arbitration algorithms. While this approach is acceptable in many computing system environments, use of a PCI bus to exchange data between components in the computer system can encounter signal integrity and timing constraints that can limit the total speed available for communications between computerized device components. In addition, a PCI bus is fixed in physical size (e.g., 32 bits, 64 bits, 128 bits) and does not scale well to allow for the addition of significantly large amounts of other devices onto the bus beyond a number of bus interface connections or "slots" that a designer initially provides in the computer system. Due to such limitations and increasing requirements of modern day computer applications, computer engineers have developed another type of expandable data bus or interconnect architecture called Infiniband.

Infiniband is an industry standard, channel-based, switched fabric, interconnect architecture for computer systems such as servers and peripherals devices such as storage devices, network interconnects, memory systems, and the like. The conventional Infiniband architecture operates much like a computer network in that each component, peripheral or device that operates in (i.e., that communicates over) an Infiniband architecture or network is equipped with an Infiniband channel adapter that provides input output onto one or more Infiniband communications channels or links (i.e., physical links) that can be coupled to Infiniband switches or that can directly couple to other Infiniband adapters. Infiniband supports a 2.5 Gbps wire-speed connection in each direction on each wire and allows three different performance levels (1×, 4× and 12×) that correspond to three different possible physical connectivity characteristics between the channel adapters. For the 1× performance level which is the lowest performance available in Infiniband, there is one physical data link, wire or connection between adapters (for the total single wire bandwidth of 2.5 Gbps in each direction), whereas the 4× performance level provides four physical parallel links between adapters (for a total bandwidth of 12 Gbps in each direction), and the 12× performance level provides twelve physical parallel links between adapters (for a total bandwidth of 30 Gbps in each direction).

When a component equipped with an Infiniband adapter begins operation, the Infiniband input output protocol operating in the adapter (i.e., operating according to the Infiniband standard) performs an initialization sequence to detect how many Infiniband channels (i.e., physical links) are connected between the adapter and a remote device such as an Infiniband switch to which that adapter is coupled. The Infiniband initialization sequence can query each Infiniband port in the channel adapter and can store the detected number of physical links for each port in a respective configuration parameter for each port called the "LinkWidthEnabled" configuration parameter. The initialization process stores this physical connectivity characteristic for future use during operation of the Infiniband protocol. The LinkWidthEnabled configuration parameter thus stores and defines or describes the actual physical connectivity characteristic of that channel adapter to a remote location, for each port on the channel adapter. In other words, the LinkWidthEnabled configuration parameter for a port identifies the number of physical Infiniband channels or links (e.g., 1×, 4× or 12×) that exist, for example, between a port in a target channel adapter and another port in a host channel adapter or a port in an Infiniband switch.

Thereafter, when data communications between a device equipped with the Infiniband channel adapter is to take place, an Infiniband initialization handshaking sequence occurs between the Infiniband channel adapters to establish, among other things, the proper bandwidth to use for communications. As an example, a host channel adapter can query a target channel adapter for the value of its LinkWidthEnabled configuration parameter to determine what bandwidth or data communications performance level (i.e., 1×, 4× or 12×) that target channel adapter supports. Recall from above that the target channel adapter sets its LinkWidthEnabled parameter during a startup configuration or initialization sequence of that channel adapter.

By way of example, suppose an Infiniband host channel adapter is coupled to an Infiniband switch with twelve Infiniband links or channels (i.e., is coupled in a 12× Infiniband configuration) to provide a server that uses that host channel adapter a maximum performance level on the Infiniband fabric. A storage device including an Infiniband target channel adapter may be coupled to the same Infiniband switch with only four Infiniband links or channels (i.e., in a 4x configuration). When the host channel adapter in the server wants to communicate with the target channel adapter in the storage device, the Infiniband input output protocol operating in the Infiniband host channel adapter performs the initial handshaking operation and queries the Infiniband target channel adapter in the storage device to determine the amount of Infiniband links with which that storage device (i.e., via its target channel adapter) is coupled to the Infiniband switch. The Infiniband input output protocol operating in the target channel adapter in the storage device consults its LinkWidthEnabled configuration parameter (automatically configured during the initialization setup of the adapter in the storage device, as explained above) to reply to the host channel adapter with how many physical Infiniband links (4x in this example) exist between the target channel adapter (in the storage device) and the Infiniband switch. In this manner, upon receipt of the reply containing the LinkWidthEnabled configuration parameter value (e.g., 4x) from the target channel adapter, the host channel adapter can determine that the target channel adapter is only configured in a 4x configuration. As a result, the Infiniband host channel adapter knows it can only communicate with the target channel adapter at a 4x performance level and will "step down" its data communications performance to the target channel adapter from the 12x performance level to the 4x performance level. During Infiniband data communications, the host channel adapter will only use four of the available twelve Infiniband channels or links to communicate with the target channel adapter.

SUMMARY OF THE INVENTION

Conventional techniques and mechanisms for controlling bandwidth between devices or components that utilize conventional input output interconnect architectures and protocols such as PCI and Infiniband suffer from a variety of deficiencies. In particular, PCI and Infiniband (i.e., the bus interconnect architectures and associated communications protocols) provide no inherent way to purposefully limit bandwidth to less than a maximum supported level that two communicating device in an existing configuration provide. As an example, using a conventional PCI interconnect bus architecture operating at 100 MHz, there is no way to easily cause components coupled to the PCI bus to perform at a bandwidth that is significantly less than 100 MHz. As another example, using a conventional Infiniband interconnect architecture, if a channel adapter such as an Infiniband target channel adapter is coupled to an Infiniband switch in a 12x configuration (i.e., has 12 physical Infiniband links from a port in the target channel adapter to a port in an Infiniband switch) and the target channel adapter communicates with a host channel adapter that is also coupled to the switch in a 12x configuration, there is no way to purposefully cause the Infiniband target and host channel adapters to operate at a bandwidth or performance level less than the 12x configuration. Infiniband devices such as an Infiniband host adapter coupled in a 12x configuration to an Infiniband fabric can step down to a lower bandwidth maximum of a lesser configured device, such as another Infiniband device coupled to the Infiniband fabric at an 4x configuration. However, there is no way to operate such a configuration (i.e, a 12x coupled via a switch to an 4x) in a lower configuration than 1x. In other words, the Infiniband architecture is designed to operate at a maximum supported performance level based upon an actual existing physical connectivity characteristic of the host and target channel adapters involved in communication. To this end, conventional interconnect architectures such as Infiniband and PCI are both intended to always operate at their maximum or highest performance level with respect to bandwidth used for transmission of data between components.

Embodiments of the invention are based in part on the observation that it can be desirable, for various commercial and support (i.e., upgrade) reasons, to purposefully limit or otherwise control data communications performance of a device that communicates using an input output protocol (i.e., architecture and associated communications protocol (s) that operate of the architecture), such as the Infiniband protocol, to a performance level that is less than a maximum supported performance level. Specifically, embodiments of the invention are based in part on a realization that it may be more economical to initially establish, configure and/or sell a computerized device or system that incorporates a data communications device such as an Infiniband channel adapter that is preconfigured in its maximum or highest potential physical configuration (thus potentially supporting maximum performance levels, such as 12x), but then allow or enforce upon a customer which purchased and operates the computerized device (i.e., the device containing an adapter being configured to a maximum performance level, such as 12x) to only allow operation of the device at a performance level (e.g., a level lesser than maximum, such as 1x or 4x) for which that customer paid to the vendor of the device.

As an example, consider a computerized device or other component that is designed to operate in an environment that uses an interconnect architecture and protocol such as Infiniband. A manufacturer of the computerized device can realize economic gains by selling the computerized device in a configuration that supports the highest potential performance level of the Infiniband protocol. In particular, the manufacturer may configure the computerized device in an 12x Infiniband configuration such that host channel adapters and target channel adapters of all components within the computerized device (e.g., within a server configured to operate with data storage, memory systems, network interconnects and the like) are all interconnected using 12 separate physical Infiniband links (12x). This allows all components in the computerized device or system (e.g., all channel adapters and Infiniband switches) to potentially communicate with each other at the highest possible Infiniband performance level (i.e., 12x). Embodiments of the invention however make it possible for such a manufacturer to sell computerized devices or components configured in this manner but that actually operate at less than maximum performance levels. In other words, even though the devices and the system is configured and interconnected in such a manner as to support the maximum Infiniband performance level of 12x, embodiments of the invention allow this pre-configured Infiniband infrastructure to operate as lesser performance levels, such as 1x or 4x. This may be beneficial in situations, for instance, where a customer only desires to pay for a lesser performing Infiniband equipped computerized device, system or component.

As an example, the customer may only currently require a performance level of 1x or 4x for a computerized device or component that uses the Infiniband architecture and may not desire to pay for (or may not require or be able to afford) the computerized device, system or component configured to operate at a 12x performance level. By utilizing embodiments of the invention as will be explained, components that operate using an interconnect architecture such as Infiniband are capable of operating at different vendor-selectable and vendor-controllable performance levels, regardless of performance levels (e.g., maximum) that the physical configuration of the device or system actually supports. As a specific example, embodiments of the invention allow an Infiniband device to operate at a performance level such as 1× or 4×, even though the device is physically configured (i.e., has an actual physical connectivity characteristic) to operate at a 12× performance level.

Since the manufacturer or vendor of the device only incurs a relatively small additional manufacturing, setup, or configuration cost to produce, configure, or setup the device or an entire system to support an interconnect architecture such as Infiniband that is configured to its maximum possible performance level, through the use of embodiments of the invention, a customer is able to purchase a device in its maximum performance configuration, but is only required to pay for the level of performance desired or required at the time of purchase that may be less than the maximum. In the future, if the customer decides that additional performance is required, that customer can simply pay for the vendor to enable or "turn on", via embodiments of the invention, subsequently higher performance levels of the device. One advantage is that the device or system (e.g., an interconnection of Infiniband adapters coupled in a 12× configuration) will already be enabled with such performance capability. Embodiments of the invention thus avoid a manufacturer from having to produce multiple product lines of devices, such as Infiniband channel adapters, that each operate at different performance levels. In addition, since Infiniband channel adapters equipped to operate according to embodiments of the invention are designed and configured to support a range of performance levels, customers employing such devices within computer systems can simply connect them together in a 12× maximum performance configuration. Thereafter, should customer performance requirements change, the customer (or a vendor providing customer support) does not need to reconnect the devices with more physical links (e.g., move from a 4× connection setup to a 12× setup) nor does the customer need to replace channel adapters when higher performance is required or desired.

Embodiments of the invention thus result in substantial savings to the customer and significantly remove requirements to reconfigure an existing interconnection architecture to change its performance level. Embodiments of the invention thus significantly reduce modifications that are typically required in conventional interconnect architectures such as conventional Infiniband systems that require replacement of channel adapters and installation of additional physical Infiniband links between new higher performance channel adapters in order to obtain higher performance levels for data communications within the device.

More specifically, embodiments of the invention provide mechanisms and techniques for controlling data communications performance of a device that communicates using an input output protocol (e.g., interconnect architecture and its associated protocol communications) such as, for example, Infiniband (e.g., that operates according to Infiniband standard). Such embodiments are implemented in a performance controller that can control data communications performance of the device using one or more performance or bandwidth limiting or adjustment techniques that are not available in conventional implementations of interconnect architectures. One such method embodiment comprises the steps of setting a configuration parameter of the input output protocol to a first value. The configuration parameter describes, to the input output protocol operating within the device (such as an Infiniband channel adapter), a virtual physical connectivity characteristic of the device to at least one other device operating the input output protocol (e.g., another Infiniband channel adapter).

As an example, in one embodiment, the input output protocol operates according to the Infiniband protocol and interconnect standard. The configuration parameter of the input output protocol in one embodiment is the LinkWidthEnabled parameter, as defined within the Infiniband protocol standard, that describes a physical port state indicating how at least one port of the device is physically coupled to at least one other port of another device operating the input output protocol that also operates according to the Infiniband protocol standard.

Embodiments of the invention operate in the device to communicate data at a first performance level corresponding to the first value of the configuration parameter. As an example, one embodiment sets the first value of the configuration parameter to indicate a first virtual physical connectivity characteristic of the device (e.g., 4×) that is less than an actual physical connectivity characteristic of the device (e.g., the device is actually configured in a 12× configuration). The virtual physical connectivity characteristic of the device described by the configuration parameter indicates, to the input output protocol, a virtual representation of how many different physical connections exist between the device and at least one other device operating the input output protocol.

In one embodiment, the step of operating the device to communicate data at a first performance level causes the device to communicate at a performance level (e.g., 4×) that is less than a performance level (e.g., 12×) supported by the actual physical connectivity characteristic of the device. The actual physical connectivity characteristic of the device is equal to how many actual different physical connections exist between the device and at least one other device operating the input output protocol. As another example, another embodiment sets the second value of the configuration parameter to indicate a second virtual physical connectivity characteristic of the device (e.g., ×12) that is greater than the first virtual physical connectivity characteristic of the device (e.g., ×4) established by the step of setting the first value of the configuration parameter. In this manner, the step of operating the device to communicate data at a second performance level causes the device to communicate at a second performance level that is greater than the first performance level.

Embodiments of the invention then operate to change the first value of the configuration parameter to a second value such that the input output protocol perceives a virtual change to the physical connectivity characteristic of the device without the device experiencing an actual change to its physical connectivity characteristic. In other words, embodiments of the invention are able to adjust the configuration parameter from a first value to a second value in order to change the performance of data communications device provided by the input output protocol such as Infiniband, without having to change or adjust or modify the actual physical connectivity characteristic of the device equipped with this embodiment of the invention. As a result, a channel adapter such as an Infiniband target channel adapter can be configured in a 12× configuration and embodiments of the invention can set the initial value of the configuration parameter (e.g., of LinkWidthEnabled) to be 1× or 4× and can operate the device to perform data communications at this first performance level. Thereafter, by changing the first value of the configuration parameter to a second value (e.g., changing from 1× to 4×) and without changing the actual physical connectivity characteristic of the device (i.e., that supports up to the 12× performance level), embodiments of the invention then operate the device to communicate data at the second performance level (e.g., 4× as opposed to 1×) corresponding to the second value of the configuration parameter.

In another embodiment, the steps of setting the confirmation parameters to first and second values each comprise a respective step of selecting the first and second value, respectively, from a predetermined range of values that the input output protocol uses to determine how many actual different physical connections exist between the device and at least one other device operating the input output protocol. In other embodiments of the invention, the predetermined range of values includes respective values representing one physical connection, four physical connections and twelve physical connections existing between the device and at least one other device operating the input output protocol according to the Infiniband protocol standard and the actual physical connectivity characteristic of the device is equal to twelve physical connections existing between the device and the other device operating the input output protocol.

In order to set the configuration parameter, one embodiment of the invention determines a factory value of the configuration parameter of the input output protocol within the device and overrides the factory value of the configuration parameter with the first value that is different than the factory value, such that the step of operating the device to communicate data at a first performance level causes the device to communicate data in a performance level that is less than a maximum performance level corresponding to the factory value of the configuration parameter.

Other embodiments of the invention include a computerized device, workstation, handheld or laptop computer, or the like configured with software and/or circuitry (e.g., a processor or performance controller operating as summarized above) to process any or all of the method operations disclosed herein as embodiments of the invention. In other words, a computerized device, channel adapter, software program or a processor that is programmed or configured to operate as explained herein with a performance controller is considered an embodiment of the invention. As a specific example, an Infiniband host or target channel adapter that operates as explained herein in conjunction with a performance controller is an embodiment of the invention.

Other embodiments of the invention that are disclosed herein include software programs to perform the method embodiment steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, Infiniband channel adapters, computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide methods for controlling data communications performance of a device (e.g., an Infiniband channel adapter) that communicates using an input output protocol that operates with an interconnection architecture such as, for example, Infiniband. Generally, embodiments of the invention allow a vendor or manufacturer of the data communications device designed to operate within an interconnection architecture such as Infiniband to produce, sell, configure and/or install the device in a configuration that supports maximum performance while at the same time allowing the device to operate at less than a maximum performance level. As an example, an Infiniband channel adapter manufacturer can configure an Infiniband channel adapter equipped to operate with the invention at the 12× performance level (i.e., in a 12× configuration). Embodiments of the invention within such devices or software can operate to adjust the operational bandwidth of such a devices or of such software to be less than the supported maximum performance level configuration (e.g., less than 12×).

Generally, to do so, embodiments of the invention set a configuration parameter, such as the LinkWidthEnabled parameter utilized by Infiniband channel adapters, to a value that defines a virtual physical connectivity characteristic of the device to at least one other device operating the same input output protocol (i.e., another Infiniband device). By "virtual" physical connectivity characteristic, was meant is that the value of the configuration parameter can be different than an actual performance level supported by the actual physical connectivity characteristic (e.g., the 12× configuration) of the device. Embodiments of the invention are able to operate the device (i.e., cause the device to operate) to communicate data at a first performance level that corresponds to the setting of the configuration parameter. The device, such as an Infiniband channel adapter) thus operates, for example, at a 1× or 4× performance level, over a 12× actual physical configuration.

In addition, embodiments of the invention allow changes to be made to the first value of the configuration parameter such that operation of the input output protocol (i.e., such that the operating Infiniband protocol and architecture) perceives a virtual change to the physical connectivity characteristic of the device, without the device experiencing an actual change to its physical connectivity characteristic (i.e., without modifying the 12× configuration). This allows devices configured, for example, using the Infiniband interconnection architecture to be configured to support a maximum performance level (12×) but to actually operate at a performance level that is different than the maximum performance level (1× or 4×). Accordingly, customers purchasing devices equipped with embodiments of the invention are able to pay for different levels of performance required or desired without having to swap hardware and without having to modify the existing physical configuration. To avoid such physical changes, embodiments of the invention change the configuration parameter (e.g., by overriding the setting of LinkWidthEnabled) to indicate (i.e., to fool) to the Infiniband protocol into thinking that the new physical connectivity characteristic is present which allows, for example, a higher performance (i.e., a high bandwidth) of data communications to take place. As a result, the Infiniband protocol increases its performance level to operate the device to communicate data at the higher performance level when in actuality, no physical change was made to the physical connectivity characteristic of the device.

Figure 1:
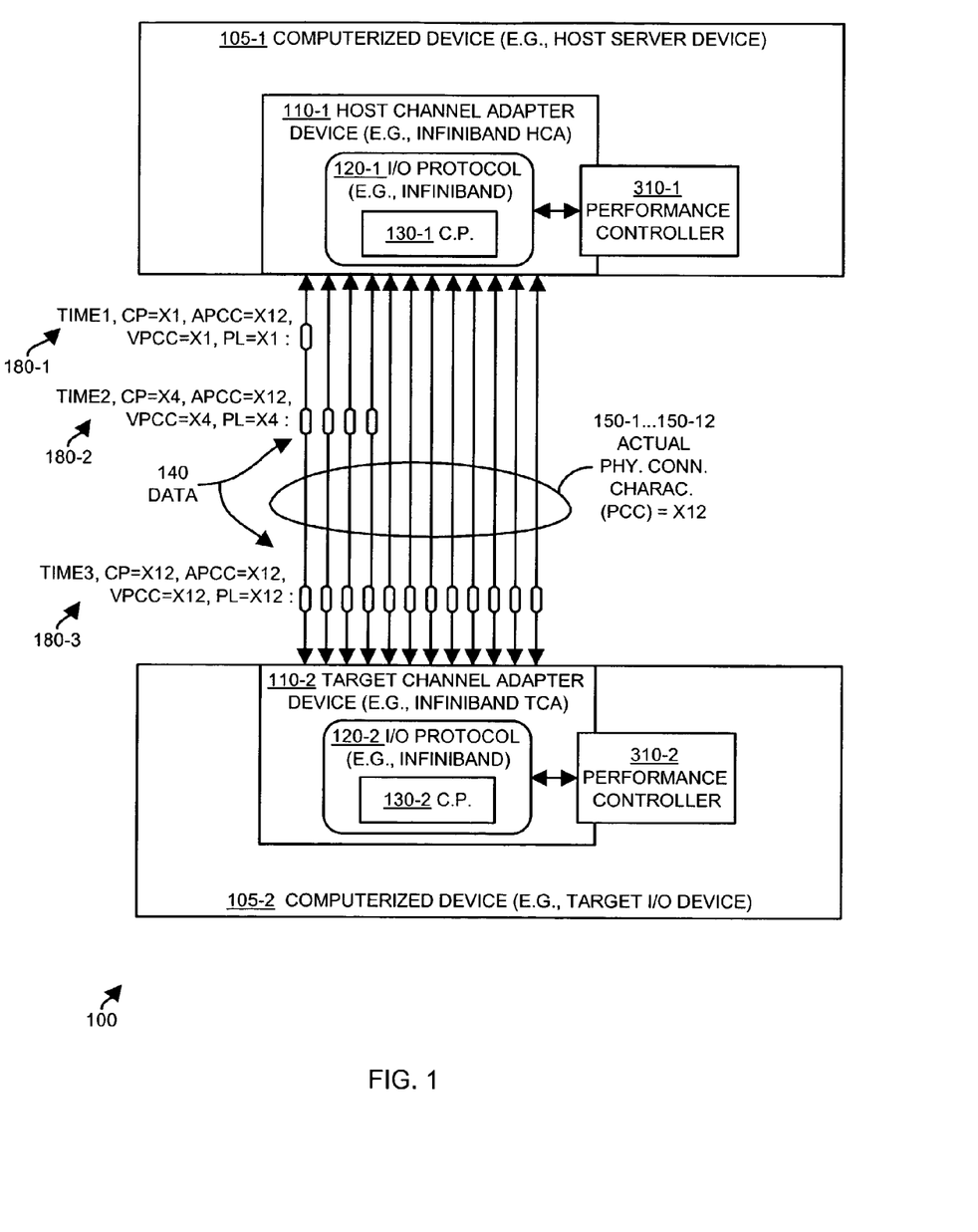
FIG. 1 illustrates a computer system environment suitable for use in explaining operation of embodiments of the invention.

FIG. 1 illustrates an example environment 100 that shows an interconnection of two computerized devices 105-1 and 105-2 and that is suitable for use in explaining example operations of embodiments of the invention. The computerized device 105-1 may be, for example, a host computer such as a server that incorporates or operates in conjunction with a host channel adapter device 110-1, that in this example is an Infiniband host channel adapter. The host channel adapter device 110-1 operates an input output protocol 120-1 that in this example is the Infiniband protocol. The host channel adapter device 110-1 thus operates according to the Infiniband interconnection architecture standard and protocol. The input output protocol 120-1 includes a configuration parameter 130-1 which may be, in one embodiment of invention, the "LinkWidthEnabled" parameter as specified by the Infiniband interconnection architecture standard (as discussed above). Also operating within the computerized device 105-1 is a performance controller 310-1 configured to operate according to embodiments of the invention.

In a similar manner, the computerized device 105-2, which may be a target input output device such as a data storage system, memory system or other input output component operates a target channel adapter device 110-2, that in this example, is an Infiniband target channel adapter. The target channel adapter device 110-2 operates an input output protocol 120-2 such as Infiniband that includes a configuration parameter 130-2 such as the LinkWidthEnabled parameter, as specified by the Infiniband interconnection architecture standard. The computerized device 105-2 also operates a performance controller 310-2 configured according to embodiments of the invention.

The host channel adapter device 110-1 in the server computerized device 105-1 is coupled to the target channel adapter device 110-2 in the target computer device 105-2 by a plurality of communications links 150. The communication links 150 may be, for example, Infiniband physical channel connections between the channel adapter devices 110 and may be individual physical optical or copper wire connections acceptable for use in an Infiniband fabric. In this configuration, there are 12 communication links 150-1 through 150-2 that define the actual physical connectivity characteristic that exists between the channel adapter devices 110-1 and 110-2. In other words, the communication links 150 are configured according to a 12× Infiniband connectivity characteristic that defines or supports operation of a 12× Infiniband communication performance level. Portions of data 140 (e.g., Infiniband packets) are communicated over the communication links 150 as will be explained herein.

Along the left-hand side of the physical connection links 150 are example settings or values 180-1 through 180-3 of various parameters as they appear at different times during operation embodiments of the invention. In particular, each example group of parameter settings 180 corresponds to a different time (TIME1, TIME2 and TIME3) of operation of communications between the channel adapter devices 110 over the physical links 150. The CP parameter represents the value of the configuration parameter 130 as currently set and the TIME for that example 180 within the input output protocol 120 operating between the channel adapters 110. The "APCC" value represents a value of the actual physical connectivity characteristic between the channel adapter devices 110. In this example, APCC is always set to 12× representing that there are always (i.e., during each time slice for which parameter values are illustrated in FIG. 1) 12 actual physical connections 150-1 through 150-12 between the channel adapter devices 110. for embodiments of the invention that relate to Infiniband, APCC could also be 4× in which case only four links 150 would exists between the adapters 110. "VPCC" represents a current value for the virtual physical connectivity characteristic between the channel adapter devices 110. Generally, the virtual physical connectivity characteristic (VPCC) of the device 110 is equal to or identifies the current setting or value of the configuration parameter 130 and indicates, to the input output protocol 120, a "virtual" (i.e., not always the same as actual reality) representation of how many different physical connections 150 currently exist between the device 110-1 and the device 110-2. The abbreviation PL represents the current performance level at which data communications are carried out between the channel adapter devices 110 and is governed by the values of CP and VPCC. The use and modification of specific values of these various parameters will be explained shortly with respect to a detailed discussion of operation of the performance controllers 310 configured according to embodiments of the invention.

Generally, performance of the input output protocol 120 is dependent upon the number of physical connections 150 that the input output protocol understands to exist between the devices 110-1 and 110-2 that are in communication. The number of actual physical connections 150 thus defines an actual physical connectivity characteristic of the device. The current value of the configuration parameter 130 in a device indicates a virtual physical connectivity characteristic of the device that the input output protocol 120 uses to establish a performance level (e.g., 1×, 4× or 12×) for data communications (e.g., for Infiniband communications). The virtual physical connectivity characteristic of the device thus describes, to the input output protocol 120, a virtual (i.e., not necessarily true) representation of how many different physical connections 150 exist between the device 110 and at least one other device 110 operating the same input output protocol such as Infiniband. The actual physical connectivity characteristic of the device is equal to how many actual different physical connections, channels or links 150 truly exist between the device 110 and at least one other device operating the input output protocol. Generally, actual physical connectivity characteristic of the device does not change and the devices 110 are interconnected according to a maximum performance level (i.e., 12× for Infiniband).

The performance controller 310 operating within each computerized device 105 operates according to embodiments of the invention to control data communications performance of the channel adapter devices 110 using the techniques explained herein. It is to be understood that the performance controllers 310 can be implemented as either software, hardware or a combination thereof within the computerized devices 105, within the channel adapter devices 110 and/or within the input output protocol 120 or as hardware and/or software within any combination of these devices and components illustrated in FIG. 1. The illustrated placement of the performance controller 310 in FIG. 1 is not intended to limit embodiments of the invention to implementation within specific portions of a computer system, the channel adapter or an implementation of a protocol such as Infiniband operating within a computerized device. In addition, it is to be understood that both devices 105-1 and 105-2 do not need to be equipped with the performance controller for the invention to operate. In such cases, if a single device 105 is configured with the invention, the other device can, for example, negotiate down in bandwidth to a falsely advertised performance level set forth by the device 105 that does operate the performance controller configured according to embodiments of the invention.

Figure 2:
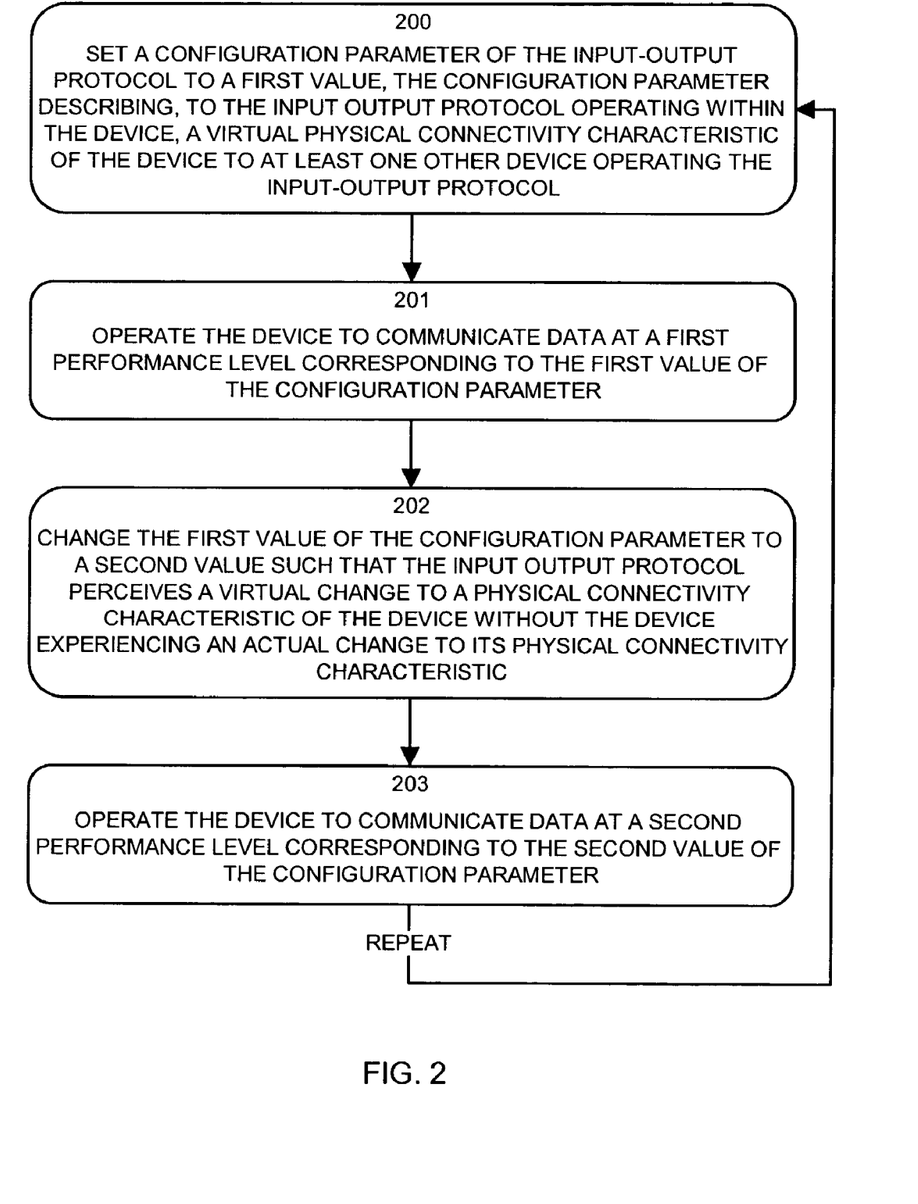
FIG. 2 is a flow chart of processing steps performed by a computerized device such as an Infiniband channel adapter operating in conjunction with a performance controller configured according to one embodiment of the invention.

FIG. 2 is a flow chart of processing steps performed by a performance controller 310 operating in accordance with one example embodiment of the invention. The operation of the steps 200 through 203 in FIG. 2 will be discussed with respect to the example interconnection architecture environment 100 discussed above and illustrated in FIG. 1. The operations of the steps in FIG. 2 will generally be discussed as being performed by a performance controller 310. However, for this example discussion, assume that the processing operations shown in the steps in FIG. 2 are performed by the performance controller 310-2 operating in conjunction with the target channel adapter device 110-2 within the target computerized device 105-2. The performance controller 310-1 operating in conjunction with the host channel adapter 110-1 can perform similar operations.

In step 200, the performance controller 310 (e.g., 310-2) sets a configuration parameter 130 (CP) (e.g., 130-2) of the input output protocol 120 to a first value (i.e., 1× in the first example 180-1 at TIME1 in FIG. 1). The configuration parameter 130 describes, to the input output protocol 120 operating within the device 110 (e.g., 110-2), a virtual physical connectivity characteristic (VPCC) of the device to at least one other device (e.g., 110-1) also operating the input output protocol 120 (e.g., operating Infiniband in conjunction with the adapter working with the performance controller performing these steps).

Next, in step 201 the performance controller 310 operates the device 110 to communicate data at a first performance level (e.g., 1×) corresponding to the first value (e.g., 1×) of the configuration parameter 130. Referring to the example 180-1 in FIG. 1, at TIME1 (i.e., a first point in time during which data communications takes place between the adapters 110) the performance controller 310 performing step 200 sets a configuration parameter 130-2 (CP) to a value representing a 1× level of performance (for Infiniband applications). As shown by the value 1× of the virtual physical connectivity characteristic (VPCC), this value equals the value to which the configuration parameter 130 is set (by the performance controller 310) in step 200. Accordingly, as also illustrated by the example 180-1, the performance level (PL) is also 1× but the actual physical connectivity characteristic (APCC) remains unchanged and is set or configured (e.g., permanently, prior to operation of the invention) to 12×. Accordingly, this example 180-1 illustrates how two channel adapter devices 110-1 and 110-2 can be physically connected according to a maximum performance configuration of twelve Infiniband links 150 (12×) while Infiniband host and target channel adapters 110-1 and 110-2 configured according to this maximum performance configuration can actually perform communications at a performance level that is less than the maximum performance configuration due to operation of embodiments of the invention.

More specifically, in the example 180-1, the performance controller 310-2 has set the first value of the configuration parameter 130-2 to indicate a first virtual physical connectivity characteristic (1×) of the target channel adapter device that is less than an actual physical connectivity characteristic (i.e., 12×) of the device, such that the step 201 of operating the device to communicate data at a first performance level causes the device to communicate at a performance level 1× that is less than a performance level 12× supported by the actual physical connectivity characteristic (i.e., 12×) of the device.

Next, in step 202, the performance controller 310 changes the first value of the configuration parameter 130 to a second value (e.g., 4× or 12×) such that the input output protocol 120 perceives a virtual change to the (actual) physical connectivity characteristic of the device 110 without the device 110 experiencing an actual change to its physical connectivity characteristic. As an example, the performance controller 310 can change the configuration parameter 130 from the value 1× to the value 4× to increase data communications performance, while the actual physical connectivity characteristic remains at 12×. Change the value of the configuration parameter can be done, for example, when the customer that owns or operates the device 110 pays a vendor of the device 110 for a higher performance level. At this point, the vendor can, for example, securely log in to the device 110 and can update or change the configuration parameter to allow the device 110 to operate the protocol 120 at a higher performance level. The customer would not be aware of how to do this, nor would the customer be authorized to perform this change to the configuration parameter 130. In this manner, a vendor of the devices 110 can sell, install and configure the devices 110 to support maximum performance and can sell a license to use the devices 110 to the customer at different performance levels for different monetary amounts.

Next, in step 203, the performance controller 310 causes or allows the device 110 to communicate data at a second performance level corresponding to the second value (e.g., 4×) of the configuration parameter 130 (i.e., said in step 203).

As an example, in step 202, the performance controller 310 (i.e., under control of a vendor who remotely logs into the device computerized device 105 containing the device 110) sets the second value (e.g., currently set at 1×—the first value) of the configuration parameter 130 to indicate a second or new virtual physical connectivity characteristic (4×) of the device that is greater than the first virtual physical connectivity characteristic (1×) of the device established by the step (i.e., step 200) of setting the first value of the configuration parameter (but that, in this example, is still less than the maximum physical connectivity characteristic 12x), such that the step of operating the device 110 to communicate data 140 at a second performance level causes the device to communicate data at a second performance level (4x) that is greater than the first performance level (1x).

This is illustrated by the example 180-2 in FIG. 1 at TIME2 in which the configuration parameter 130 is set to 4x which causes the input output protocol 120 to perceive a change to the virtual physical connectivity characteristic of 4x thus providing a data communications performance level or bandwidth rating of 4x, while the actual physical connectivity characteristic 12x remains unchanged. As shown in FIG. 1, when comparing the difference between examples 180-1 and 180-2 (i.e., TIME1 vs. TIME2), in the example 180-1, only one physical communications link 150-1 is used for communication of data 140 at the performance level 1x, whereas in the example 180-2, four (4) communications links 150-1 through 154 are used to communicate data 140 at the performance level 4x (e.g., four 2.5 Gbps Infiniband channels).

It is to be understood that variations and different combinations to the aforementioned first and second value settings of configuration parameters 130 in steps 200 and 202 can be achieved to accomplish different objectives. As an example, in one embodiment of the invention, in step 200 and as illustrated by the example 180-3 at TIME3 in FIG. 1, the performance controller 310 sets the first value of the configuration parameter 130 to indicate a first virtual physical connectivity characteristic value of 12x, that happens to be equal to the actual physical connectivity characteristic of the device 12x. As such, the step 200 of operating the device to communicate data at a first performance level causes the device to initially communicate at a maximum performance level.

Embodiments of the invention can operate the performance controller 310 to step down or reduce the performance level from a higher initial level to a lower subsequent level. As an example, the performance controller 310 in one embodiment of the invention can set (in step 202) a configuration parameter of the input output protocol to a second value (e.g., 4x) to indicate a second virtual physical connectivity characteristic of the device (e.g., 4x) that is less than the first virtual physical connectivity characteristic of the device (12x) established by the step (i.e., step 200) of setting the first value of the configuration parameter. In this case, the step (i.e., step 203) of operating the device to communicate data at a second performance level causes the device to communicate at a second performance level 4x that is less than the maximum and initial performance level 12x.

Note that after processing step 203, processing returns in this embodiment to step 200 in order to receive another change to the value of the configuration parameter. In this manner, as the configuration parameter 130 changes values, operation of the device tracks the current setting of the configuration parameter 130, as opposed to being limited, as in conventional interconnect architectures, to only performing at a performance level commensurate with the actual physical connections available (e.g., the maximum current Infiniband configuration).

It is to be understood that in embodiments of the invention, the input output protocol 120 can operate according to the Infiniband protocol standard and the configuration parameter of the input output protocol is the LinkWidthEnabled Infiniband configuration parameter, defined within the Infiniband protocol standard, that describes a physical port state indicating to the input output protocol, how at least one port of the device 110 is physically coupled (e.g., via links 150) to at least one other port of at least one other device 110 operating the input output protocol operating according to the Infiniband protocol standard. Embodiments of the invention override the factory or default initialization setting of this configuration parameter after initialization of the channel adapter in order to cause the device 110 to communicate a performance levels that are different than the actual supported interconnect configuration.

Figure 3:
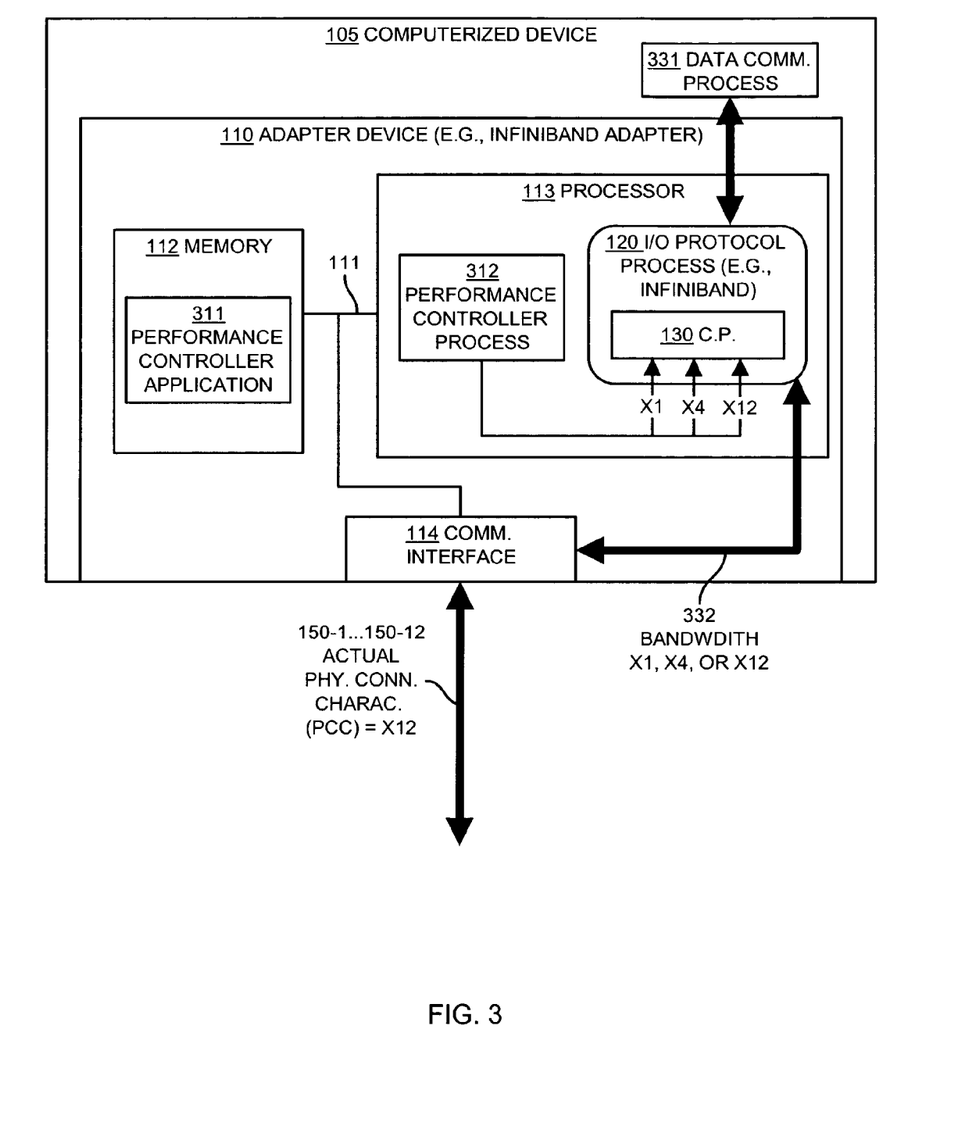
FIG. 3 is an example architecture of a computerized device configured to operate a performance controller according to one embodiment of the invention.

FIG. 3 illustrates a more detailed architecture of a computerized device 105 configured to operate an adapter device 110 in accordance with embodiments of the invention. In this example, the computerized device 105 operates a data communications process 331 that represents any application, processor, controller or other entity that requires the ability to communicate data 140 using the adapter device 110 that in this example is in Infiniband channel adapter.

The adapter device 110 (e.g., in Infiniband channel adapter) includes an interconnection mechanism 111 such as circuitry that couples the memory system 112, a processor 113 and a communications interface 114 (e.g., an Infiniband port). The processor 113 operates the input output protocol process 120 that in this example provides the ability to perform data communications using the Infiniband interconnect architecture over the communications interface 114 using one or more of the available actual physical connection links 150-1 through 150-12 that couple the communications interface 114 to other adapter devices 110 or to devices such as an Infiniband switch (not shown in this example).

The memory system 112 is any type of computer readable medium such as semiconductor memory (volatile or non-volatile) or another type of storage media such as magnetic storage media (e.g., magnetic disk media that may be removable) or optical storage media). The memory 112 is encoded with data, logic instructions or other information that form a performance controller application 311. In other words, the performance controller application 311 in this example embodiment of the invention represents software code, data and/or logic instructions configured to carry out operations of embodiments of the invention as explained herein when performed within a device 110.

The processor 113 represents any type of controller, microprocessor, central processing unit, application specific integrated circuit (ASIC), electronic circuitry or other hardware that is capable of accessing the memory 112 over the interconnection mechanism 111. Doing so allows the processor 113 to access (e.g., read) and then execute, run, interpret or otherwise perform the performance controller application 311 in order to produce or form (e.g., instantiate) the performance controller process 312. In other words, the performance controller process 312 represents a run-time instantiation of the performance controller application 311. It is to be understood that the performance controller application 311 and the performance controller process 312 represent runtime and non-run-time embodiments of the performance controller 310 illustrated in FIG. 1 and discussed above.

In operation of the computerized device 105 illustrated in FIG. 3, the input output Infiniband protocol process 120 continuously monitors the configuration parameter 130 to determine what the physical connectivity characteristic exists within the communications interface 114 to other adapter devices 110. Using this information, a device that desires to communicate with the adapter device 110 can perform a handshaking sequence (not shown) with the input output protocol 120 which uses the configuration parameter 130 to report its current (and in the case of this invention, its perceived) virtual physical connectivity characteristic that represents the input output protocol's 120 understanding of how many physical links 150 couple this adapter device 110 to the Infiniband fabric (e.g., to another Infiniband device).

In conventional operation of the Infiniband protocol, the configuration parameter 130 is the LinkWidthEnabled parameter and is never less than the actual physical connectivity characteristic of the communications interface 114 (e.g., an Infiniband port). In other words, the value of the configuration parameter 130 in conventional operation of the Infiniband protocol is set to a value 1×, 4× or 12× when, and only when the actual physical connectivity characteristic of the device 110 is 1×, 4× and 12×, respectively. The value of the configuration parameter 130 does not change in conventional operation of the Infiniband protocol unless an administrator of the computerized device 105 changes the actual physical connectivity characteristic of the device by adding or removing communications links 150 to the communications interface 114. According to the Infiniband specification, this parameter is used for reporting to requesting devices (i.e., remotely located Infiniband channel adapters) what the current available bandwidth is for the device being queried and its value is set based on the true or actual physical configuration. There are no provisions in the Infiniband protocol standard to allow this configuration parameter to be modified.

As illustrated in FIG. 3 however, embodiments of the invention provide the performance controller application 311 which, when executed by the processor 113 provides the performance controller process 312 which can modify the value of the configuration parameter 130 irrespective of the actual physical connectivity characteristic of the device, which in this example is maximized in a performance level configuration of 12×. Accordingly, the processor 113 can access the performance controller application 311 to produce the performance controller process 312 which can set the value of the configuration parameter 130 to different performance levels as specified, for example, by a vendor upon receipt of payment from the customer for higher (or lower) performance as needed.

For operation of embodiments of the invention that relate to the Infiniband protocol, the possible settings of the configuration parameter 130 in one embodiment of the invention are 1×, 4× or 12× and are not dependent upon the actual physical connectivity characteristic which represents the true or actual number of Infiniband channel links 150 that are currently coupled to the communications interface 114. By being able to override and modify the value of the configuration parameter in real-time, during communications session operation, embodiments of the invention are able to cause the input output Infiniband protocol process 120 to change its bandwidth (e.g., in real-time, without significantly disturbing communications between devices other than for a very short retraining time that is accepted) due to its reliance upon the setting a value of the configuration parameter 130.

Accordingly, if a customer purchases an adapter device 110 equipped with the performance controller 310 configured according to embodiments of the invention, they can purchase different levels of performance in which case the performance controller process 312 can set the configuration parameter 130 to correspond with a specific performance level purchased by the customer. As an example, a customer might purchase a low performance level of 1×. The adapter device may however be, preconfigured from the vendor within the computerized device 105 to have an actual physical connectivity characteristic of 12× thus allowing a possible range of performance levels including 1×, 4× or 12×. Accordingly, the steps of setting the configuration parameter to the first and second values can select specific values from a predetermined range of values including respective values representing one physical connection (1×), four physical connections (4×) and twelve physical connections (12×) existing between the device and at least one other device operating the input output protocol according to the Infiniband protocol standard.

Figure 4:
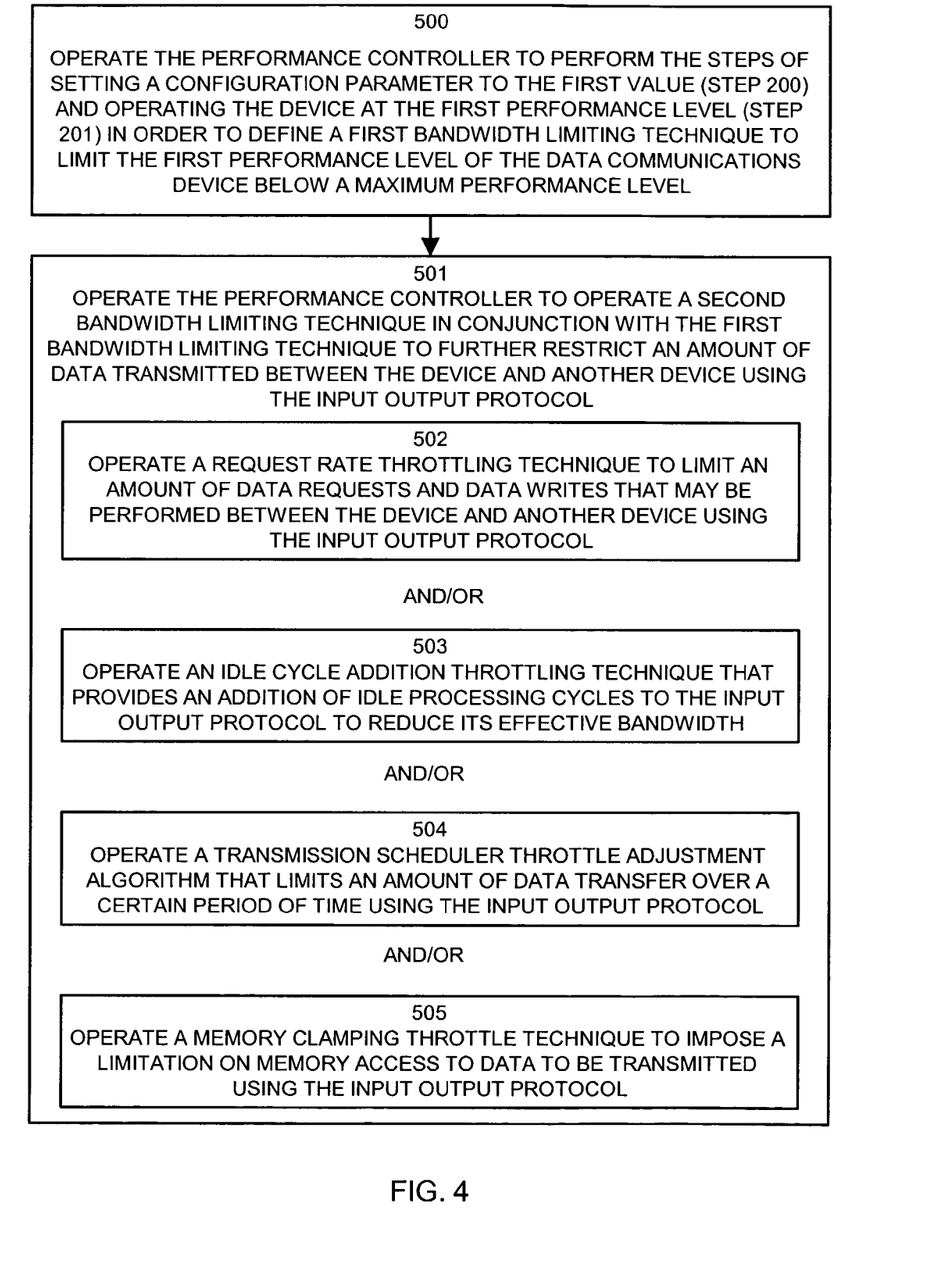
FIG. 4 is a flow chart of processing steps that illustrate processing steps performed by a device equipped with a performance controller configured according to one embodiment of the invention.

FIG. 4 illustrates processing steps performed according to an alternative embodiment of the invention to perform multiple bandwidth limiting techniques that involve modification (i.e., setting and then subsequently changing) the configuration parameter as explained in the aforementioned embodiments in addition to other bandwidth limiting techniques. In particular, embodiments of the invention can utilize the aforementioned configuration parameter modification bandwidth limiting techniques to limit data communications performance or bandwidth of an Infiniband channel adapter and can combine this technique with other bandwidth limiting techniques to further control or limit bandwidth of a data communications device such as a channel adapter.

In particular, other bandwidth limiting techniques can include performing a request rate throttling technique that limits an amount of data requests and data writes that may be performed over the communications interface between the device and the at least one other device using the Infiniband protocol over a certain period of time. This essentially limits how many Infiniband protocol commands can be processed by the device 110 in order to slow the device down, regardless of the physical connectivity characteristic of the device.

Another bandwidth limiting technique in another embodiment can perform an idle cycle addition throttling technique that provides an addition of idle processing cycles to be input output protocol to reduce its effective bandwidth. In other words, inserting idle processor cycles into the processor instructions stream when performing the input output protocol construction sequence will cause the input output protocol to run at a slower pace thus decreasing the overall effective bandwidth of data communications provided by the input output protocol.

Yet another example of a bandwidth limiting technique is to perform a transmission scheduler throttle adjustment algorithm that limits an amount of data transfer over a certain period of time using the input output protocol over the data communications interface. In other words, the input output algorithm could include a metric that indicates a certain amount of data that the device 10 can transfer over the communications interface over a predetermined period of time and the input output protocol is configured to halt transmission of data when the limit is reached until expiration of the time period.

A further example of a secondary bandwidth limiting technique would be to perform a memory clamping throttle technique to impose a limitation on memory access to data to be transmitted using the input output protocol. As an example, the speed at which the input output protocol 120 can access memory to retrieve data 140 to be transferred over the communications interface could be limited such that reduced ability to access data causes the input output protocol to reduce its effective bandwidth or ability to transmit data over the communications interface. The flow chart in FIG. 4 illustrates an example embodiment of the invention that includes operating the aforementioned bandwidth limiting technique to adjust the configuration parameter in combination with one or more of the aforementioned additional bandwidth limiting techniques.

In step 500, the device 110 operates the performance controller 310 to perform steps of setting a configuration parameter to the first value (i.e., step 200 in FIG. 2) and operating the device in the first performance level (step 201 in FIG. 2) in order to define a first bandwidth limiting technique to limit the first performance level of the data communications device below a maximum performance level. In other words, in step 500, this embodiment of the invention performs steps 200 and 201 (FIG. 2) by adjusting the value of the configuration parameter to the first performance level in order to operate the data communications device to communicate at the first performance level, as explained above.

As noted above, in one embodiment of the invention, the input output protocol operates according to an Infiniband protocol standard. Accordingly, the first bandwidth limiting technique performed in step 500 causes the input output protocol to limit operation of the device to communicate data using the Infiniband protocol standard by setting a value of the configuration parameter to be a virtual value that is less than an actual number of Infiniband physical connections between the devices 110.

Next, in step 501, the device operates the performance controller to operate a second bandwidth limiting technique in conjunction with the first bandwidth limiting technique (step 500) to further restrict an amount of data transmitted between the device and the other device using the input output protocol.

Specifically the second bandwidth limiting technique can include operation of one or more of the sub-steps 502 through 505. That is, one or more of steps 502 through 505 may be performed by the performance controller 310 in order to operate a second bandwidth limiting technique in conjunction with the first bandwidth limiting technique of step 500.

In particular, in step 502, the performance controller can perform a secondary bandwidth limiting technique in order to operate a request rate throttling technique that limits an amount of data requests and data writes that may be performed between the device and the at least one other device using the input output protocol.

In step 503, the performance controller can perform a secondary bandwidth limiting technique in order to operate an idle cycle addition throttling technique that provides an addition of idle processing cycles to be input output protocol to reduce its effective bandwidth.

In step 504, the performance controller can perform a secondary bandwidth limiting technique in order to operate a transmission scheduler throttle adjustment algorithm that limits an amount of data transfer over a certain period of time using the input output protocol.

In step 505, the performance controller can perform a secondary bandwidth limiting technique in order to operate a memory clamping throttle technique to impose a limitation on memory access to data to be transmitted using the input output protocol.

Using a combination of the aforementioned bandwidth limiting techniques, embodiments of the invention can further precisely control bandwidth of Infiniband channel adapters when such adapters are configured to support a maximum performance level. In addition, the second bandwidth limiting techniques can limit latency of data transmitted between devices, thus further affecting performance of data communications.

According to the aforementioned mechanisms and techniques, embodiments of the invention provide unique mechanisms (e.g., computer systems and architecture) and techniques and methods for controlling bandwidth in a device such as an Infiniband channel adapter. Those skilled in the art will understand that various modifications and variations can be made to the aforementioned processing techniques will still achieving the general operation of embodiments of the invention. As an example, the order of processing steps in the aforementioned flow charts can be rearranged while still accomplishing the objectives of the described embodiments. It is to be understood that such variations are intended to be covered by the scope of this invention. As such, the foregoing description of embodiments of the invention are not intended to be the limiting. Rather, any limitations to the invention are presented in the following claims.

What is claimed is:

1. A method for controlling data communications performance of a physical device that communicates using an input output protocol, the method comprising the steps of:
   setting a configuration parameter of the input output protocol to a first value, the configuration parameter describing, to the input output protocol operating within the physical device, a virtual physical connectivity characteristic of the physical device to at least one other device operating the input output protocol;
   operating the physical device to communicate data at a first performance level corresponding to the first value of the configuration parameter;
   changing the first value of the configuration parameter to a second value such that the input output protocol perceives a virtual change to the physical connectivity characteristic of the physical device without the physical device experiencing an actual change to its physical connectivity characteristic; and
   operating the physical device to communicate data at a second performance level corresponding to the second value of the configuration parameter.

2. The method of claim 1 wherein the step of setting a configuration parameter of the input output protocol to a first value comprises the step of:
   setting the first value of the configuration parameter to indicate a first virtual physical connectivity characteristic of the physical device that is less than an actual physical connectivity characteristic of the physical device, such that the step of operating the physical device to communicate data at a first performance level causes the physical device to communicate at a performance level that is less than a performance level supported by the actual physical connectivity characteristic of the physical device.

3. The method of claim 2 wherein the step of setting a configuration parameter of the input output protocol to a second value comprises the step of:
   setting the second value of the configuration parameter to indicate a second virtual physical connectivity characteristic of the physical device that is greater than the first virtual physical connectivity characteristic of the physical device established by the step of setting the first value of the configuration parameter, such that the step of operating the physical device to communicate data at a second performance level causes the physical device to communicate at a second performance level that is greater than the first performance level.

4. The method of claim 1 wherein the step of setting a configuration parameter of the input output protocol to a first value comprises the step of:
setting the first value of the configuration parameter to indicate a first virtual physical connectivity characteristic of the physical device that is equal to an actual physical connectivity characteristic of the physical device, such that the step of operating the physical device to communicate data at a first performance level causes the physical device to communicate at a maximum performance level.

5. The method of claim 4 wherein the step of setting a configuration parameter of the input output protocol to a second value comprises the step of:
setting the second value of the configuration parameter to indicate a second virtual physical connectivity characteristic of the physical device that is less than the first virtual physical connectivity characteristic of the physical device established by the step of setting the first value of the configuration parameter, such that the step of operating the physical device to communicate data at a second performance level causes the physical device to communicate at a second performance level that is less than the maximum performance level.

6. The method of claim 1 wherein:
the virtual physical connectivity characteristic of the physical device described by the configuration parameter indicates, to the input output protocol, a virtual representation of how many different physical connections exist between the physical device and at least one other device operating the input output protocol;
the actual physical connectivity characteristic of the physical device is equal to how many actual different physical connections exist between the physical device and at least one other device operating the input output protocol; and
wherein the respective steps of setting the confirmation parameters to first and second values each comprise a respective step of selecting the first and second value, respectively, from a predetermined range of values that the input output protocol uses to determine how many actual different physical connections exist between the physical device and at least one other device operating the input output protocol.

7. The method of claim 6 wherein:
the physical device is an Infiniband adapter;
the input output protocol operates according to the Infiniband protocol standard;
the predetermined range of values includes respective values representing one physical connection, four physical connections and twelve physical connections existing between the physical device and at least one other device operating the input output protocol according to the Infiniband protocol standard; and
wherein the actual physical connectivity characteristic of the physical device is equal to at least one of:
i) four physical connections existing between the physical device and at least one other device operating the input output protocol; and
ii) twelve physical connections existing between the physical device and at least one other device operating the input output protocol.

8. The method of claim 7 wherein the configuration parameter of the input output protocol is a LinkWidthEnabled parameter, defined within the Infiniband protocol standard, that describes a physical port state indicating how at least one port of the physical device is physically coupled to at least one other port of the at least one other device operating the input output protocol according to the Infiniband protocol standard.

9. The method of claim 1 wherein the step of setting a configuration parameter of the input output protocol comprises the steps of:
determining a factory value of the configuration parameter of the input output protocol within the physical device; and
overriding the factory value of the configuration parameter with the first value that is different than the factory value, such that the step of operating the physical device to communicate data at a first performance level causes the physical device to communicate data in a performance level that is less than a maximum performance level corresponding to the factory value of the configuration parameter.

10. The method of claim 1 wherein:
the steps of setting a configuration parameter and operating the physical device in a first performance level define a first bandwidth limiting technique to limit the first performance level of the data communications performance of the physical device below a maximum performance level; and
wherein the method further comprises the step of:
operating a second bandwidth limiting technique in conjunction with the first bandwidth limiting technique to restrict an amount of data transmitted between the physical device and the at least one other device using the input output protocol.

11. The method of claim 10 wherein:
the input output protocol operates according to an Infiniband protocol standard;
the first bandwidth limiting technique causes the input output protocol to limit operation of the physical device to communicate data using the Inifiniband protocol standard by setting a value of the configuration parameter, which is an Inifiband protocol parameter defining how many Infiniband physical connections exist between the physical device and the at least one other device operating the input output protocol according to the Infiniband standard, to be virtual value that is less than an actual number of Infiniband physical connections between the physical device and the at least one other device;
and wherein the second bandwidth limiting technique comprises at least one of:
i) a request rate throttling technique that limits an amount of data requests and data writes that may be performed between the physical device and the at least one other device using the input output protocol;
ii) an idle cycle addition throttling technique that provides an addition of idle processing cycles to be input output protocol to reduce its effective bandwidth;
iii) a transmission scheduler throttle adjustment algorithm that limits an amount of data transfer over a certain period of time using the input output protocol; and
iv) a memory clamping throttle technique to impose a limitation on memory access to data to be transmitted using the input output protocol.

12. The method of claim 1 wherein performance of the input output protocol is dependent upon a number of physical connections between the physical device and the at least one other device that define a physical connectivity characteristic of the physical device, and wherein the value of the configuration parameter indicates a virtual physical connectivity characteristic of the physical device that the input output protocol uses to establish a performance level for data communications.

13. A physical device comprising:
a communications interface; and
a processor operating a performance controller, the performance controller capable of controlling data communications performance of an input output protocol operating within the physical device over the communications interface, the performance controller causing the data communications physical device to perform the steps of:
setting a configuration parameter of the input output protocol to a first value, the configuration parameter describing, to the input output protocol operating within the physical device, a virtual physical connectivity characteristic of the communications interface of the physical device to at least one other device operating the input output protocol;
operating the physical device to communicate data, over the communications interface, at a first performance level corresponding to the first value of the configuration parameter;
changing the first value of the configuration parameter to a second value such that the input output protocol perceives a virtual change to the physical connectivity characteristic of the physical device without the physical device experiencing an actual change to its physical connectivity characteristic of the communications interface; and
operating the physical device to communicate data, over the communications interface, at a second performance level corresponding to the second value of the configuration parameter.

14. The physical device of claim 13 wherein when the performance controller causes the processor in the physical device to perform the step of setting a configuration parameter of the input output protocol to a first value, the performance controller causes the processor in the physical device to perform the step of:
setting the first value of the configuration parameter to indicate a first virtual physical connectivity characteristic of the physical device that is less than an actual physical connectivity characteristic of the physical device, such that the step of operating the physical device to communicate data at a first performance level causes the physical device to communicate at a performance level over the communications interface that is less than a performance level supported by the actual physical connectivity characteristic of the physical device over the communications interface.

15. The physical device of claim 14 wherein when the performance controller causes the processor in the physical device to perform the step of setting a configuration parameter of the input output protocol to a second value, the performance controller causes the processor in the physical device to perform the step of:
setting the second value of the configuration parameter to indicate a second virtual physical connectivity characteristic of the physical device that is greater than the first virtual physical connectivity characteristic of the physical device established by the step of setting the first value of the configuration parameter, such that the step of operating the physical device to communicate data at a second performance level causes the physical device to communicate at a second performance level over the communications interface that is greater than the first performance level.

16. The physical device of claim 13 wherein when the performance controller causes the processor in the physical device to perform the step of setting a configuration parameter of the input output protocol to a first value, the performance controller causes the processor in the physical device to perform the step of:
setting the first value of the configuration parameter to indicate a first virtual physical connectivity characteristic of the physical device that is equal to an actual physical connectivity characteristic of the physical device, such that the step of operating the physical device to communicate data at a first performance level causes the physical device to communicate at a maximum performance level over the communications interface.

17. The physical device of claim 16 wherein when the performance controller causes the processor in the physical device to perform the step of setting a configuration parameter of the input output protocol to a second value, the performance controller causes the processor in the physical device to perform the step of:
setting the second value of the configuration parameter to indicate a second virtual physical connectivity characteristic of the physical device that is less than the first virtual physical connectivity characteristic of the physical device established by the step of setting the first value of the configuration parameter, such that the step of operating the physical device to communicate data at a second performance level over the communications interface causes the physical device to communicate at a second performance level that is less than the maximum performance level.

18. The physical device of claim 13 wherein:
the virtual physical connectivity characteristic of the physical device described by the configuration parameter indicates, to the input output protocol, a virtual representation of how many different physical connections exist between the physical device and at least one other device operating the input output protocol over the communications interface;
the actual physical connectivity characteristic of the physical device is equal to how many actual different physical connections exist between the communications interface of the physical device and at least one other device operating the input output protocol; and
wherein the respective steps of setting the confirmation parameters to first and second values each comprise a respective step of selecting the first and second value, respectively, from a predetermined range of values that the input output protocol uses to determine how many actual different physical connections exist between the physical device and at least one other device operating the input output protocol.

19. The physical device of claim 18 wherein:
the physical device is an Infiniband adapter;
the input output protocol operates according to the Infiniband protocol standard;
the predetermined range of values includes respective values representing one physical connection, four physical connections and twelve physical connections existing between the physical device and at least one other device operating the input output protocol according to the Infiniband protocol standard; and
wherein the actual physical connectivity characteristic of the physical device is equal to at least one of:

i) four physical connections existing between the physical device and at least one other device operating the input output protocol; and ii) twelve physical connections existing between the physical device and at least one other device operating the input output protocol.

20. The physical device of claim 19 wherein the configuration parameter of the input output protocol is a LinkWidth-Enabled parameter, defined within the Infiniband protocol standard, that describes a physical port state of the communications interface indicating how at least one port of the communications interface in the physical device is physically coupled to at least one other port of the at least one other device operating the input output protocol according to the Infiniband protocol standard.

21. The physical device of claim 13 wherein when the performance controller causes the processor in the physical device to perform the step of setting a configuration parameter of the input output protocol, the performance controller causes the processor in the physical device to perform the steps of:

determining a factory value of the configuration parameter of the input output protocol within the physical device; and overriding the factory value of the configuration parameter with the first value that is different than the factory value, such that the step of operating the physical device to communicate data at a first performance level causes the physical device to communicate data in a performance level over the communications interface that is less than a maximum performance level corresponding to the factory value of the configuration parameter.

22. The physical device of claim 13 wherein:

the steps of setting a configuration parameter and operating the physical device in a first performance level define a first bandwidth limiting technique to cause the processor to limit the first performance level of the data communications performance of the physical device below a maximum performance level; and wherein the performance controller causes the processor in the physical device to perform the step of:

operating a second bandwidth limiting technique in conjunction with the first bandwidth limiting technique to cause the processor to restrict an amount of data transmitted between the physical device and the at least one other device over the communications interface using the input output protocol.

23. The physical device of claim 22 wherein:

the input output protocol operates according to an Infiniband protocol standard;

the first bandwidth limiting technique causes the input output protocol to limit operation of the physical device to communicate data using the Infiniband protocol standard over the communications interface by setting a value of the configuration parameter, which is an Infiniband protocol parameter defining how many Infiniband physical connections exist between the physical device and the at least one other device operating the input output protocol over the communications interface according to the Infiniband standard, to be a virtual value that is less than an actual number of Infiniband physical connections between the physical device and the at least one other device over the communications interface;

and wherein the second bandwidth limiting technique comprises at least one of:

i) a request rate throttling technique that limits an amount of data requests and data writes that may be performed between the physical device and the at least one other device over the communications interface using the input output protocol;

ii) an idle cycle addition throttling technique that provides an addition of idle processing cycles to the input output protocol to reduce its effective bandwidth;

iii) a transmission scheduler throttle adjustment algorithm that limits an amount of data transfer over a certain period of time over the communications interface using the input output protocol; and iv) a memory clamping throttle technique to impose a limitation on memory access to data to be transmitted using the input output protocol.

24. The physical device of claim 13 wherein performance of the input output protocol is dependent upon a number of physical connections between the physical device and the at least one other device over the communications interface that define a physical connectivity characteristic of the physical device, and wherein the value of the configuration parameter indicates a virtual physical connectivity characteristic of the physical device that the input output protocol uses to establish a performance level for data communications over the communications interface.

25. A computer program product stored in a computer-readable medium including computer program logic encoded thereon that, when performed in a physical device having a communications interface, provides a performance controller to control communications performance of the physical device over the communications interface by performing the operations of:

setting a configuration parameter of the input output protocol to a first value, the configuration parameter describing, to the input output protocol operating within the physical device, a virtual physical connectivity characteristic of the communications interface of the physical device to at least one other device operating the input output protocol;

operating the physical device to communicate data, over the communications interface, at a first performance level corresponding to the first value of the configuration parameter;

changing the first value of the configuration parameter to a second value such that the input output protocol perceives a virtual change to the physical connectivity characteristic of the physical device without the physical device experiencing an actual change to its physical connectivity characteristic of the communications interface; and operating the physical device to communicate data, over the communications interface, at a second performance level corresponding to the second value of the configuration parameter.

26. A physical device comprising:

a communications interface; and a processor operating a performance controller, the performance controller providing a means for controlling data communications performance of an input output protocol operating within the physical device over the communications interface, the means including:

means for setting a configuration parameter of the input output protocol to a first value, the configuration parameter describing, to the input output protocol operating within the physical device, a virtual physical connectivity characteristic of the communications interface of the physical device to at least one other device operating the input output protocol;

means for operating the physical device to communicate data, over the communications interface, at a first performance level corresponding to the first value of the configuration parameter;

means for changing the first value of the configuration parameter to a second value such that the input output protocol perceives a virtual change to the physical connectivity characteristic of the physical device without the physical device experiencing an actual change to its physical connectivity characteristic of the communications interface; and means for operating the physical device to communicate data, over the communications interface, at a second performance level corresponding to the second value of the configuration parameter.

* * * * *